US012811484B2

(12) United States Patent
Lee et al.

(10) Patent No.: US 12,811,484 B2
(45) Date of Patent: Nov. 24, 2026

(54) VOLTAGE REGULATOR CIRCUIT FOR VEHICLE LAMPS

(71) Applicant: ESUSE AUTO PARTS MANUFACTURING CO., LTD., New Taipei City (TW)

(72) Inventors: Ting-Fang Lee, New Taipei City (TW); Wen-Chung Han, New Taipei City (TW)

(73) Assignee: ESUSE AUTO PARTS MANUFACTURING CO., LTD., New Taipei City (TW)

( * ) Notice: Subject to any disclaimer, the term of this patent is extended or adjusted under 35 U.S.C. 154(b) by 20 days.

(21) Appl. No.: 19/176,229

(22) Filed: Apr. 11, 2025

(65) Prior Publication Data

US 2026/0322236 A1 Oct. 15, 2026

(51) Int. Cl.

| | |
|---|---|
| ***H02M 1/00*** | (2007.01) |
| ***B60R 16/03*** | (2006.01) |
| ***H02M 1/44*** | (2007.01) |
| ***H02M 7/04*** | (2006.01) |

(52) U.S. Cl.

CPC ....... *H02M 1/0016* (2021.05); *H02M 1/0009* (2021.05); *H02M 1/0045* (2021.05); *H02M 1/44* (2013.01); *H02M 7/04* (2013.01); *B60R 16/03* (2013.01)

(58) Field of Classification Search

CPC ... B60R 16/03; H02M 1/0009; H02M 1/0016; H02M 1/0045; H02M 1/44

See application file for complete search history.

(56) References Cited

U.S. PATENT DOCUMENTS

| | | | | |
|---|---|---|---|---|
| 2018/0255613 | A1* | 9/2018 | Galvano | H05B 45/395 |
| 2025/0193984 | A1* | 6/2025 | Yang | H05B 45/60 |

* cited by examiner

*Primary Examiner* — Charles J Han

(74) *Attorney, Agent, or Firm* — MUNCY, GEISSLER, OLDS & LOWE, P.C.

(57) ABSTRACT

A voltage regulator circuit for vehicle lamps includes a power input unit; a step-down control unit, a feedback voltage regulation output unit capable of supplying conduction voltage to the lamps, a current sensing unit including a current sensor, a comparator and a judge and capable of outputting judgment data, and a processing unit, which receives the judgment data and performs calculations. If there is a large voltage difference between the conduction voltage and the feedback adjusted output voltage, the current sensor can generate a large sensing current and the lamps can be turned on. If the conduction voltage and the feedback adjusted output voltage are at the same potential, the lamps cannot be turned on and a voltage boost adjustment is required.

9 Claims, 1 Drawing Sheet

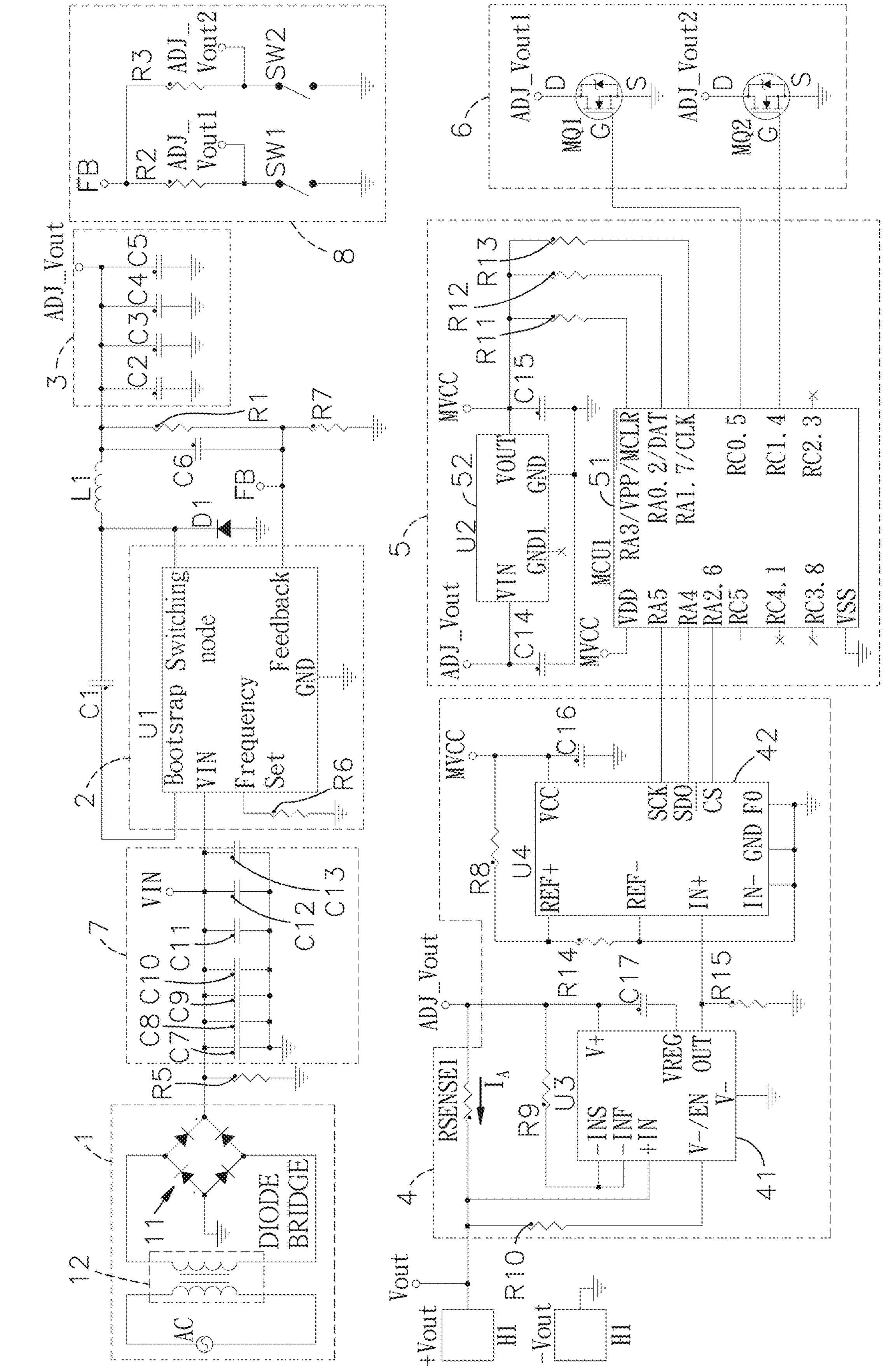
AC
DIODE BRIDGE
11
12
1
R5
C7
C8
C9
C10
C11
C12
C13
VIN
7
2
U1
C1
Bootsrap
Switching node
VIN
Frequency Set
Feedback
GND
R6
L1
D1
C6
FB
R1
R7
3
ADJ_Vout
C2
C3
C4
C5
8
FB
R2
R3
ADJ_Vout1
ADJ_Vout2
SW1
SW2
6
MQ1
MQ2
D
G
S
5
U2
52
VIN
GND1
VOUT
GND
C14
C15
MVCC
51
MCU1
VDD
RA5
RA4
RA2.6
RC5
RC4.1
RC3.8
VSS
RA3/VPP/MCLR
RA0.2/DAT
RA1.7/CLK
RC0.5
RC1.4
RC2.3
R11
R12
R13
4
42
U4
VCC
SCK
SDO
CS
FO
GND
REF+
REF-
IN+
IN-
C16
R8
R14
R15
C17
41
U3
V+
VREG
OUT
V-
-INS
-INF
+IN
V-/EN
R9
RSENSE1
$I_A$
R10
Vout
+Vout
-Vout
H1

VOLTAGE REGULATOR CIRCUIT FOR VEHICLE LAMPS

BACKGROUND OF THE INVENTION

1. Field of the Invention

The present invention relates to a voltage regulator circuit for vehicle lamps, and in particular, a processing unit of the voltage regulator circuit automatically controls the output of a first conduction voltage, a second conduction voltage or a third conduction voltage from low to high according to the output data of a current sensor, a comparator and a judge, so as to conduct lamps with different DC voltage specifications, thereby enabling the voltage regulator circuit to provide a variety of DC voltages.

2. Description of the Related Art

Generally, cars and motorcycles powered by internal combustion engines or motors use the operation of the engine to drive the rotor of the generator to rotate, thereby generating the necessary electricity for the electronic devices in the vehicle body (such as: ignition device, jet computer, battery, lamps of various sizes and charging port) to ensure that the electromechanical system can operate normally.

Furthermore, the output voltage of automobile and motorcycle generators is AC voltage, but most of the electronic devices in the vehicle body use DC voltage, so a bridge full-wave rectifier is coupled to the output end of the generator to filter the AC voltage and convert it into DC voltage. The voltage specification for supplying automotive lamps is about 12V DC, but the maximum AC voltage output by automobile and motorcycle generators is about 55V. Therefore, a voltage regulator circuit that performs AC/DC conversion and DC/DC step-down conversion is required to meet the requirements of automotive lamps. If the AC/DC converter or DC/DC step-down converter fails, it may cause the vehicle's lamps or other electronic devices to burn out. In addition, it is known that the voltage regulator circuit installed in automobiles and motorcycles is mostly applicable to a single voltage specification and cannot be used for electronic devices with different DC voltage specifications. The above-mentioned deficiencies of the known voltage regulator circuit need to be researched and solved by those in the industry.

SUMMARY OF THE INVENTION

Therefore, in view of the above problems and deficiencies, the inventor collected relevant information and, after multiple evaluations and considerations, designed the invention of this voltage regulator circuit for vehicle lamps.

The main object of the present invention is to provide a voltage regulator circuit for vehicle lamps, which comprises a power input unit, a step-down control unit, a feedback voltage regulation output unit capable of supplying conduction voltage to the vehicle lamps; a current sensing unit comprising a current sensor, a comparator and a judge and capable of outputting judgment data, and a processing unit, which receives the judgment data and performs calculations. If there is a large voltage difference between the conduction voltage and the feedback adjusted output voltage, the current sensor can generate a large sensing current and the lamps can be turned on. If the conduction voltage and the feedback adjusted output voltage are at the same potential, the lamps cannot be turned on and a voltage boost adjustment is required. Through the above, the processing unit automatically controls the output from low to high first conduction voltage, second conduction voltage or third conduction voltage according to the output data of the current sensor, comparator and judge, so as to conduct vehicle lamps with different DC voltage specifications, so that the voltage regulator circuit for vehicle lamps can provide a variety of DC voltages.

Another object of the present invention is that the power input unit further comprises an isolation transformer at the input end of the AC/DC converter for stepping down the AC input voltage and reducing line noise, and the AC/DC converter is composed of a bridge full-wave rectifier.

Still another object of the present invention is that the voltage regulator circuit further comprises a plurality of bypass capacitors connected in parallel and coupled between the power input unit and the step-down control unit for DC rectification.

Still another object of the present invention is that the feedback voltage regulation output unit comprises a low-pass filter and the low-pass filter is composed of a plurality of filter capacitors connected in parallel.

Still another object of the present invention is that the voltage regulator circuit further comprises a manual output voltage regulation unit coupled between the step-down control unit and the feedback voltage regulation output unit. The manual output voltage regulation unit comprises a first mechanical switch which is closed and turned on to make the conduction voltage superimposed on the first feedback adjusted output voltage, and a second mechanical switch which is closed and turned on to make the conduction voltage superimposed on the second feedback adjusted output voltage. When the manual output voltage regulation unit is activated, it can be sensed by the step-down control unit and the micro control unit and cause the automatic voltage regulation output unit to stop outputting.

Still another object of the present invention is that the judgment data of the judge comprises a serial clock signal, a serial data output signal and a chip select signal.

BRIEF DESCRIPTION OF THE DRAWINGS

The FIGURE is a circuit diagram of the voltage regulator circuit for vehicle lamps of the present invention.

DETAILED DESCRIPTION OF+THE PREFERRED EMBODIMENT

In order to achieve the above-mentioned objects and effects, the technical means and structure adopted by the present invention are described in detail with reference to the preferred embodiment of the present invention, and its features and functions are as follows, so as to facilitate a complete understanding.

Please refer to the FIGURE, which is a circuit diagram of the voltage regulator circuit for vehicle lamps of the present invention. As can be clearly seen from the FIGURE, the voltage regulator circuit of the present invention mainly comprises a power input unit 1, a step-down control unit 2, a feedback voltage regulation output unit 3, a current sensing unit 4, a processing unit 5 and an automatic voltage regulation output unit 6. Its main components and features are described in detail as follows:

The power input unit 1 comprises an AC/DC converter 11 for converting AC power into DC power and outputting a high DC voltage.

The step-down control unit 2 receives the high DC voltage, performs voltage reduction processing, and outputs a low DC voltage.

The feedback voltage regulation output unit 3 receives the low DC voltage and performs high-frequency noise filtering, and adjusts the output voltage ADJ_Vout according to a feedback to output a conduction voltage Vout that can power a preset lamp (not shown).

The current sensing unit 4 comprises a current sensor RSENSE1 and a comparator 41 for receiving the conduction voltage Vout and comparing it with the feedback adjusted output voltage ADJ_Vout. The comparator 41 receives whether the current sensor RSENSE1 generates a sensing current (current value is about 0.2~0.3 A) and outputs a comparison data. The comparison data is logically judged by a judge 42 according to a reference value of a pair of differential signals (REF+, REF−) and outputs a judgment data.

The processing unit 5 receives the judgment data and performs calculations. If there is a larger voltage difference between the conduction voltage Vout and the feedback adjusted output voltage ADJ_Vout, the current sensor RSENSE1 can generate a larger sensing current and the preset lamp can be lit. If the conduction voltage Vout and the feedback adjusted output voltage ADJ_Vout are at the same potential, the preset lamp cannot be turned on and voltage boost adjustment is required. The voltage boost adjustment is performed by the processing unit 5 controlling a first active switch MQ1 of the automatic voltage regulation output unit 6 so that the conduction voltage Vout is superimposed with a first feedback adjusted output voltage ADJ_Vout1 and the preset lamp is lit. If the conduction voltage Vout plus the first feedback adjusted output voltage ADJ_Vout1 cannot light up the preset lamp, the processing unit 5 controls a second active switch MQ2 of the automatic voltage regulation output unit 6 to make the conduction voltage Vout plus a second feedback adjusted output voltage ADJ_Vout2 and light up the preset lamp.

The power input unit 1 further comprises an isolation transformer 12 at the input end of the AC/DC converter 11 for reducing the AC input voltage (for example, reducing the AC90V-240V output by the generator to AC55V) and reducing line noise. The AC/DC converter 11 is composed of a bridge full-wave rectifier.

A plurality of bypass capacitors 7 for DC rectification and connected in parallel are further coupled between the power input unit 1 and the step-down control unit 2, and the bypass capacitors 7 are capacitors (C7, C8, C9, C10, C11, C12, C13).

The feedback voltage regulation output unit 3 comprises a low-pass filter, and the low-pass filter is composed of a plurality of filter capacitors connected in parallel, and the filter capacitors are capacitors (C2, C3, C4, C5).

A manual output voltage regulation unit 8 is coupled at a coupling node FB between the step-down control unit 2 and the feedback voltage regulation output unit 3. The manual output voltage regulation unit 8 comprises a first mechanical switch SW1 which is closed and turned on to make the conduction voltage Vout add the first feedback adjusted output voltage ADJ_Vout1, and a second mechanical switch SW2 which is closed and turned on to make the conduction voltage Vout add the second feedback adjusted output voltage ADJ_Vout2. When the manual output voltage regulation unit 8 is activated, it can be sensed by the pin (Feedback) of the step-down control unit 2 and the micro control unit 51 and cause the automatic voltage regulation output unit 6 to stop outputting. This means that when the user knows that the voltage specification of the lamp is higher than the DC voltage 12V (for example: 24V or 48V), he or she can directly operate the manual output voltage regulation unit 8 to the voltage specification required by the lamp, omitting the operation of the micro control unit 51 to control the automatic voltage regulation output unit 6 to adjust the voltage, so that the voltage regulator circuit can provide a more stable conduction voltage of the lamp.

The judgment data of the judge 42 comprises a serial clock signal (SCK), a serial data output signal (SDO) and a chip select signal (CS).

The current sensor RSENSE1 of the current sensing unit 4 is composed of a resistor; and the comparator 41 is composed of an operational amplifier.

The processing unit 5 is composed of a micro control unit (MCU) 51 and a low-dropout regulator (LDO) 52. The low-dropout regulator 52 can reduce the voltage of the DC power supply (for example, from 5V to 3.3V) and stabilize the voltage. After the voltage is reduced to 3.3V by the low-dropout regulator 52, a rated voltage can be provided for the integrated circuits (ICs) such as the step-down control unit 2, the comparator 41, the judge 42 and the micro control unit 51, and these integrated circuits can operate stably and are not prone to burning.

The first active switch MQ1 and the second active switch MQ2 of the automatic voltage regulation output unit 6 are composed of an N-channel enhancement metal oxide semiconductor field effect transistor (N-MOSFET), and a Zener diode is connected between the source (S) and the drain (D) of the N-channel enhancement metal oxide semiconductor field effect transistor to prevent electrostatic discharge.

The voltage regulator circuit of the present invention comprises at least three conduction voltage values, wherein the voltage range of the first conduction voltage is between 11.9 and 11.999V; the voltage range of the second conduction voltage is between 23.9 and 23.999V; and the voltage range of the third conduction voltage is between 47.9 and 47.999V. The first conduction voltage is applicable to the lighting or warning lamps of cars and motorcycles; while the second and third conduction voltages are applicable to the lighting or warning lamps of engineering vehicles (for example, forklifts, cranes, excavators or bulldozers).

All resistors (R1~R15), inductors (L1) and some capacitors (C1, C6, C14, C15, C16, C17) in the voltage regulator circuit diagram are matching impedances. MCVV and VIN are external voltage sources in general circuits, so we will not describe each component in detail.

For example, the operating principle of how the micro control unit 51 adjusts the conduction voltage of the lamp according to the current sensor RSENSE1 is as follows: The initial DC voltage value of the conduction voltage Vout on the left side of the current sensor RSENSE1 is 0V; the initial DC voltage value of the feedback adjusted output voltage ADJ_Vout on the right side of the current sensor RSENSE1 is 12V. A larger voltage difference (12V-0V=12V) can cause the current sensor RSENSE1 to generate a larger sensing current $I_A$ (for example, greater than 0.25 A) and light up the preset lamp with a driving voltage of 12V. On the contrary, if there is a small voltage difference between the conduction voltage Vout and the feedback adjusted output voltage ADJ_Vout, the current sensor RSENSE1 will generate a smaller sensing current $I_A$ (for example, less than 0.2 A). When the micro control unit 51 receives the judgment data from the judge 42, if the current sensor RSENSE1 generates a small voltage difference (for example, less than 0.025V), it means that the conduction voltage Vout (for example, 11.999V) and the feedback adjusted output voltage ADJ_Vout (for example, 12V) form an equal potential or a small voltage difference, and the preset lamp cannot be lit and a voltage boost adjustment is required. The voltage boost adjustment method is: If the preset driving voltage of the preset lamp is 24V, the feedback adjusted output voltage ADJ_Vout is first set to 12V. When the conduction voltage Vout is 12V, the current sensor RSENSE1 generates a small voltage difference (for example, less than 0.025V). The processing unit 5 controls the first active switch MQ1 of the automatic voltage regulation output unit 6 to make the conduction voltage Vout superimposed on the first feedback adjusted output voltage ADJ_Vout1, so that the feedback adjusted output voltage ADJ_Vout is 24V and the preset lamp with a driving voltage of 24V is lit. If the preset driving voltage of the lamp is 48V, first set the feedback adjusted output voltage ADJ_Vout to 24V. When the conduction voltage Vout is 24V, the current sensor RSENSE1 will produce a small voltage difference (for example, less than 0.025V). The processing unit 5 controls the second active switch MQ2 of the automatic voltage regulation output unit 6 to superimpose the conduction voltage Vout with the second feedback adjusted output voltage ADJ_Vout2, thereby generating the feedback adjusted output voltage ADJ_Vout of 48V and lighting the preset lamp with a driving voltage of 48V.

The main feature of the present invention is that the processing unit 5 of the voltage regulator circuit automatically controls the output from low to high first conduction voltage (for example, 12V), second conduction voltage (for example, 24V) or third conduction voltage (for example, 48V) according to the output data of the current sensor RSENSE1, the comparator 41 and the judge 42, so as to conduct lamps with different DC voltage specifications, thereby being applicable to the voltage regulator circuit for vehicle lamps to provide a variety of DC voltages.

The above is only a preferred embodiment of the present invention, and does not limit the patent scope of the present invention. Therefore, all simple modifications and equivalent structural changes made by using the contents of the description and drawing of the present invention should be included in the patent scope of the present invention and should be declared.

In summary, the voltage regulator circuit for vehicle lamps of the present invention can achieve its effect and purpose when used, so the present invention is truly an invention with excellent practicality. In order to meet the application requirements for invention patents, we have filed an application in accordance with the law. We hope that the review committee will approve this case as soon as possible to protect the inventor's hard work in research and development. If the review committee has any questions, please feel free to write to us for instructions. The inventor will do his best to cooperate and will be grateful for the convenience.

What the invention claimed is:

1. A voltage regulator circuit for vehicle lamps, comprising:

a power input unit comprising an AC/DC converter that converts AC power into DC power and outputs a high DC voltage;

a step-down control processor configured for receiving said high DC voltage, performing voltage reduction processing, and outputting a low DC voltage;

a feedback voltage regulation output processor configured for receiving said low DC voltage and performing high frequency noise filtering, and outputting a conduction voltage that powers a preset lamp according to a feedback adjusted output voltage;

a current sensing unit comprising a current sensor and a comparator processor configured for receiving said conduction voltage and comparing said conduction voltage with said feedback adjusted output voltage;

said comparator receiving whether said current sensor generates a sensing current and outputs a comparison data, said comparison data being logically judged by a judge of said current sensing unit according to a reference value of a pair of differential signals and outputting a judgment data; and a computer configured for receiving said judgment data and performing calculation processing in such a manner that when a voltage difference greater than a threshold voltage is produced between said conduction voltage and said feedback adjusted output voltage, said current sensor generates a larger sensing current greater than a threshold current that turns on said preset lamp;

when said conduction voltage and said feedback adjusted output voltage are at the same potential, said preset lamp cannot be turned on and voltage boost adjustment is required, said voltage boost adjustment is performed by said computer by controlling a first active switch of an automatic voltage regulation output unit so that said conduction voltage is superimposed on a first feedback adjusted output voltage and said preset lamp is lit;

when said conduction voltage plus said first feedback adjusted output voltage is unable to light up said preset lamp, said computer controls a second active switch of said automatic voltage regulation output unit that makes said conduction voltage plus a second feedback adjusted output voltage light up said preset lamp.

2. The voltage regulator circuit as claimed in claim 1, wherein said power input unit further comprises an isolation transformer at an input end of said AC/DC converter that steps down AC input voltage and reduces line noise, and said AC/DC converter is composed of a bridge full-wave rectifier.

3. The voltage regulator circuit as claimed in claim 1, further comprising a plurality of bypass capacitors connected in parallel and coupled between said power input unit and said step-down control processor, wherein the step-down control processor performs fer DC rectification.

4. The voltage regulator circuit as claimed in claim 1, wherein said feedback voltage regulation output unit comprises a low-pass filter and said low-pass filter is composed of a plurality of filter capacitors connected in parallel.

5. The voltage regulator circuit as claimed in claim 1, further comprising a manual output voltage regulation unit coupled between said step-down control and said feedback voltage regulation output processor, said manual output voltage regulation unit comprising a first mechanical switch which is closed and turned on and make said conduction voltage superimposed on said first feedback adjusted output voltage, and a second mechanical switch which is closed and turned on and makes said conduction voltage superimposed on said second feedback adjusted output voltage, wherein when said manual output voltage regulation unit is activated, said manual output voltage regulation unit is sensed by said step-down control processor and a micro control processor that causes said automatic voltage regulation output processor to stop outputting.

6. The voltage regulator circuit as claimed in claim 1, wherein said judgment data of said judge comprises a serial clock signal, a serial data output signal and a chip select signal.

7. The voltage regulator circuit as claimed in claim 1, wherein said current sensor of said current sensing unit is composed of a resistor, said comparator is composed of an operational amplifier.

8. The voltage regulator circuit as claimed in claim 1, wherein said computer is composed of a micro control processor and a low-dropout regulator, said low-dropout regulator being capable of reducing and stabilizing a DC power supply.

9. The voltage regulator circuit as claimed in claim 1, wherein said first active switch and said second active switch of said automatic voltage regulation output unit are composed of an N-channel enhancement metal oxide semiconductor field effect transistor, and a Zener diode that prevents electrostatic discharge is connected between a source and a drain of said N-channel enhancement metal oxide semiconductor field effect transistor.

* * * * *